US009419859B2

(12) United States Patent
Moscibroda et al.

(10) Patent No.: US 9,419,859 B2
(45) Date of Patent: Aug. 16, 2016

(54) SERVICE ALLOCATION IN A DISTRIBUTED COMPUTING PLATFORM

(71) Applicant: Microsoft Technology Licensing, LLC, Redmond, WA (US)

(72) Inventors: Thomas Moscibroda, Beijing (CN); Zhengping Qian, Shanghai (CN); Mark Eugene Russinovich, Clyde Hill, WA (US); Xiangyao Yu, Cambridge, MA (US); Jiaxing Zhang, Beijing (CN); Feng Zhao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 418 days.

(21) Appl. No.: 13/705,039

(22) Filed: Dec. 4, 2012

(65) Prior Publication Data

US 2014/0156847 A1 Jun. 5, 2014

(51) Int. Cl.
*H04L 12/24* (2006.01)
*G06F 9/445* (2006.01)
*G06F 9/50* (2006.01)
*H04L 29/08* (2006.01)

(52) U.S. Cl.
CPC .............. *H04L 41/0893* (2013.01); *G06F 8/60* (2013.01); *G06F 8/65* (2013.01); *G06F 9/5066* (2013.01); *G06F 9/5072* (2013.01); *H04L 67/1095* (2013.01)

(58) Field of Classification Search
CPC .............. G06F 8/60; G06F 8/61; G06F 8/65; G06F 9/5066; G06F 9/5072; H04L 41/0803; H04L 41/0893; H04L 67/1095
See application file for complete search history.

(56) References Cited

U.S. PATENT DOCUMENTS

| 7,441,033 | B2 | 10/2008 | Chidambaran et al. |
|---|---|---|---|
| 8,126,843 | B2 | 2/2012 | McKenney et al. |
| 2009/0164832 | A1* | 6/2009 | Kanso et al. ...................... 714/1 |
| 2010/0106808 | A1 | 4/2010 | Ogus et al. |
| 2010/0107015 | A1* | 4/2010 | Bernabeu-Auban et al. ... 714/38 |
| 2011/0035738 | A1* | 2/2011 | Toeroe et al. ................. 717/168 |
| 2011/0099266 | A1* | 4/2011 | Calder ..................... G06F 8/65 709/224 |
| 2011/0271270 | A1 | 11/2011 | Bowen |

(Continued)

FOREIGN PATENT DOCUMENTS

WO 00/14634 A1 3/2000

OTHER PUBLICATIONS

Service Availability Forum, "Application Interface Specification", Sep. 30, 2011, B.04.01, http://devel.opensaf.org/SAI-AIS-AMF-B.04.01.AL.pdf.*

(Continued)

*Primary Examiner* — Chris Parry
*Assistant Examiner* — Daeoo Lee
(74) *Attorney, Agent, or Firm* — Sandy Swain; Micky Minhas; Lee & Hayes, PLLC

(57) ABSTRACT

The techniques and arrangements described herein provide for updating services, host operating systems and other applications while satisfying update domain constraints. In some examples, one or more controller modules may maintain a data structure including a plurality of server update domains, each server update domain including a set of machines of a plurality of machines of a distributed computing system which may be concurrently updated. The one or more controller modules may allocate the plurality of instances to the plurality of machines such that a number of server update domains is minimized.

19 Claims, 11 Drawing Sheets

(56) References Cited

U.S. PATENT DOCUMENTS

2011/0321031 A1    12/2011   Dournov et al.
2012/0102481 A1    4/2012    Mani et al.
2012/0240129 A1*   9/2012    Kanso et al. .................. 718/105

OTHER PUBLICATIONS

Bhattacharya, et al., "Dynamic Updates for Web and Cloud Applications", <<http://www.cs.ucr.edu/~neamtiu/pubs/aplwaca10bhattachrya.pdf>>, Proceedings of the Workshop on Analysis and Programming Languages for Web Applications and Cloud Applications (APLWACA), Jun. 2010, pp. 21-25.

"International Search Report & Written Opinion for PCT Application No. PCT/US2013/072676", Mailed Date: Mar. 20, 2014, Filed Date: Dec. 2, 2013, 12 Pages.

MacCormick, et al., "Kinesis: A New Approach to Replica Placement in Distributed Storage Systems", In ACM Transactions on Storage, vol. 4, Issue 4, Jan. 2009, pp. 1-28.

The European Office Action mailed Dec. 1, 2015 for European patent application No. 13815874.6, a counterpart foreign application of U.S. Appl. No. 13/705,039, 7 pages.

* cited by examiner

SERVICE ALLOCATION IN A DISTRIBUTED COMPUTING PLATFORM

BACKGROUND

The continued proliferation of cloud computing platforms that enable the building, hosting, and scaling of applications and user-provided services on large-scale compute clusters has led to an increase in systems and methods for managing these platforms. One of the functions of the cloud operating system is to decide, when a new application is deployed, onto which machines the instances constituting this application should be allocated. This decision is governed by different constraints, and has implications on the performance, scalability, and fault-tolerance of the service. One consideration is that the allocation of instances to machines creates machine update constraints, i.e., which machines can or cannot be rebooted at the same time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some implementations provide techniques and arrangements for updating services, host operating systems and other applications while satisfying update domain constraints. In some examples, one or more controller modules may maintain a data structure including a plurality of server update domains, each server update domain including a set of machines of a plurality of machines of a distributed computing system which may be concurrently updated. The one or more controller modules may allocate the plurality of instances to the plurality of machines such that a number of server update domains is minimized.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
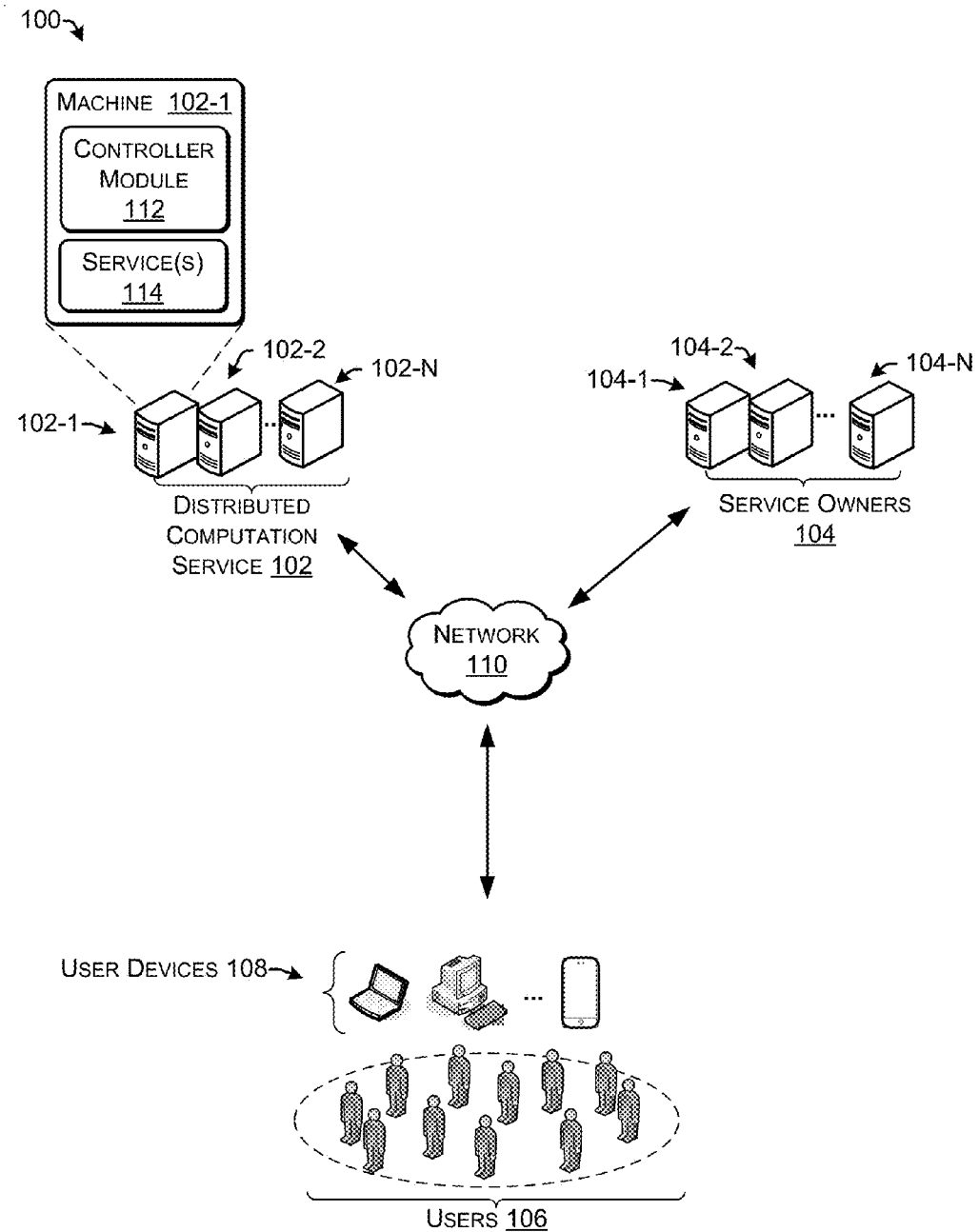
FIG. 1 is a schematic diagram of an illustrative environment according to some implementations.

Some implementations herein provide techniques and arrangements that may enable a cluster of machines (computing devices or servers) to minimize the time used for, and/or the complexity of, updating services, host operating systems and other applications while satisfying update domain (UD) constraints. In general, some implementations may provide techniques and arrangements for the allocation of instances of services given any type of availability constraints that require a minimum level of availability of the services are satisfied, for example, in the case of planned outages. In some implementations, the availability constraints may set forth that a certain set or a certain number of service instances be available, even in the face of updates, reboots, planned downtime, failures, etc. As such, while the discussion that follows is in the context of updating servers (e.g. updating all or a subset of servers in a cluster of servers), implementations are not limited to this context and may be applied to other types of availability constraints and domains related thereto.

Update domain constraints may arise from each service (e.g. each application) operating on the cluster specifying a number of update domains for that service. In some implementations, the update domains are rules that state that machines hosting instances of different update domains of the same service that may not be rebooted or taken off line concurrently. This implies that instances from different update domains of the same service may not be allocated to the same machine. Herein, allocation of an instance of a service to a machine may refer to instructing the machine to execute or operate the instance of the service. The actual deployment of the instances of the various services operating on the cluster across the machines in the cluster and the update domains that arise based on that deployment, may determine the overall update domain constraints of the cluster. The overall update domain constraints of the cluster may determine the "updateability" of the cluster, i.e., the speed and ease at which nodes in the cluster can be updated.

As stated above, this disclosure includes techniques and arrangements that may employ server update domains to minimize the time used and/or the complexity of updating the set of servers in a cluster while satisfying update domain constraints. In some such implementations, for each machine in a cluster (or other grouping of machines), a server update domain (SUD) is assigned and maintained. The SUDs may be maintained in such a way that at any time, all machines having the same SUD may be rebooted at the same time (without any update domain conflicts), i.e., machines with the same SUD may form a "reboot-class" of machines. Therefore, in some implementations, a planned update (e.g. a host-OS update of all servers in a cluster) may simply consist of rebooting the servers belonging to the same SUD, one SUD at a time. In some implementations, the techniques employed to allocate service instances to machines operate to minimize the number of SUDs, if possible. In such implementations, the minimization of the number of SUDs may result in a reduced time utilization and complexity of update processes when compared to a scenario involving a larger number of SUDs.

Two example SUD-based instance allocation and maintenance techniques discussed herein are a global server update domain (G-SUD) technique and a per-service server update domain (PS-SUD) technique. These allocation and maintenance techniques differ in the manner of how SUDs are assigned and maintained for service instances but are not meant to be taken as mutually exclusive or limiting as allocation and maintenance techniques that may be employed. Briefly stated, in G-SUD, there is a global UD→SUD mapping. Whenever a new instance is deployed to one of the machines, the SUD of that machine may be adjusted UD→SUD mapping may be adjusted, and the allocation is done in such a way as to minimize the number of different SUDs. In PS-SUD, rather than a global UD→SUD mapping, a mapping is maintained on a per-service (per-application) basis. In some implementations, this may allow for more flexibility and reduce the number of SUDs. Herein, the server update domain or SUD refers to the domains to which the machines are assigned while the update domain (UD) (also referred to herein as service update domain) refers to the update domain of an instance within a service to which server update domains may be mapped.

The allocation and maintenance functionality described herein may be implemented at various levels in the software and hardware of computing systems. Such levels include the Operating System (OS) level, such as in the OS with or without application support, the application level, either separate from OS (i.e. stand-alone) or as a plug-in to the OS or a plug-in to another application and so forth. For example, in some implementations, the allocation and maintenance functionality may be implemented by a fabric controller. Such a fabric controller may be implemented as a service within the distributed computation service's machines. In particular, the machines which execute the functions of the fabric controller are those machines to which the fabric controller is allocating service instances. In other implementations, the fabric controller may be implemented on a group of one or more machines which may be dedicated to performing the functionality of the fabric controller. For simplicity, the discussion herein will assume that the allocation and maintenance functionality is performed by controller services operating on the machines of the distributed computation service rather than on dedicated machines. An example of such an implementation is discussed below with regard to FIGS. 1 and 11.

Additionally, while the discussion herein may refer to or discuss the implementations in the context of clusters and cloud computing, the implementations are not limited to clusters or cloud computing. Also, while service may be discussed as being or in the context of applications, this is a mere example of services and should not be taken as a limitation.

Herein, update domains, server update domains, and the like are identified or labeled in the discussion herein by way of numeric identifiers or a combination of service letter and update domain number, e.g. update domain A1. Implementations are not limited to such and the identifiers may be any combination of numbers, letters, colors, or other labeling system. In some implementations, the labeling system may be an ordered identification system such as the numeric systems that are discussed herein. However, in other implementation, the labeling system may lack a stringent ordering (e.g. a labeling system based on colors). Moreover, while the implementations discussed below with respect to the drawing figures discuss two services being hosted by the distributed computation service, it should be understood that implementations are not so limited and that in some implementations, many more services may be hosted simultaneously by a distributed computation service.

For readability, interactions between modules may be described herein as signals, commands or the passage of data items, but it would be understood by one of ordinary skill in the art that such interactions may be implemented in various ways, such as by function calls between various program modules.

EXAMPLE IMPLEMENTATIONS

FIG. 1 illustrates an example environment 100 of a system according to some implementations. System 100 includes a distributed computation service 102, one or more service owners 104 and one or more users 106 using user devices 108, all communicating through a network 110.

Viewing the operation of the system 100 at this depth, the service owners 104-1 through 104-N may make requests to the distributed computation service 102, such as to the distributed controller module 112 of machine 102-1, to provide services 114 (e.g., applications) each with a number of update domains. The distributed computation service 102 allocates and maintains instances of the requested services 114 on machines 102-1, 102-2, and so on through 102-N. These services 114 are then made accessible to the users 106 by way of user devices 108. Of course, this is but one example environment in which the techniques and arrangements may operate and is provided to allow for an example context for the explanation to follow. The techniques and arrangements are certainly not limited to this environment.

Figure 2:
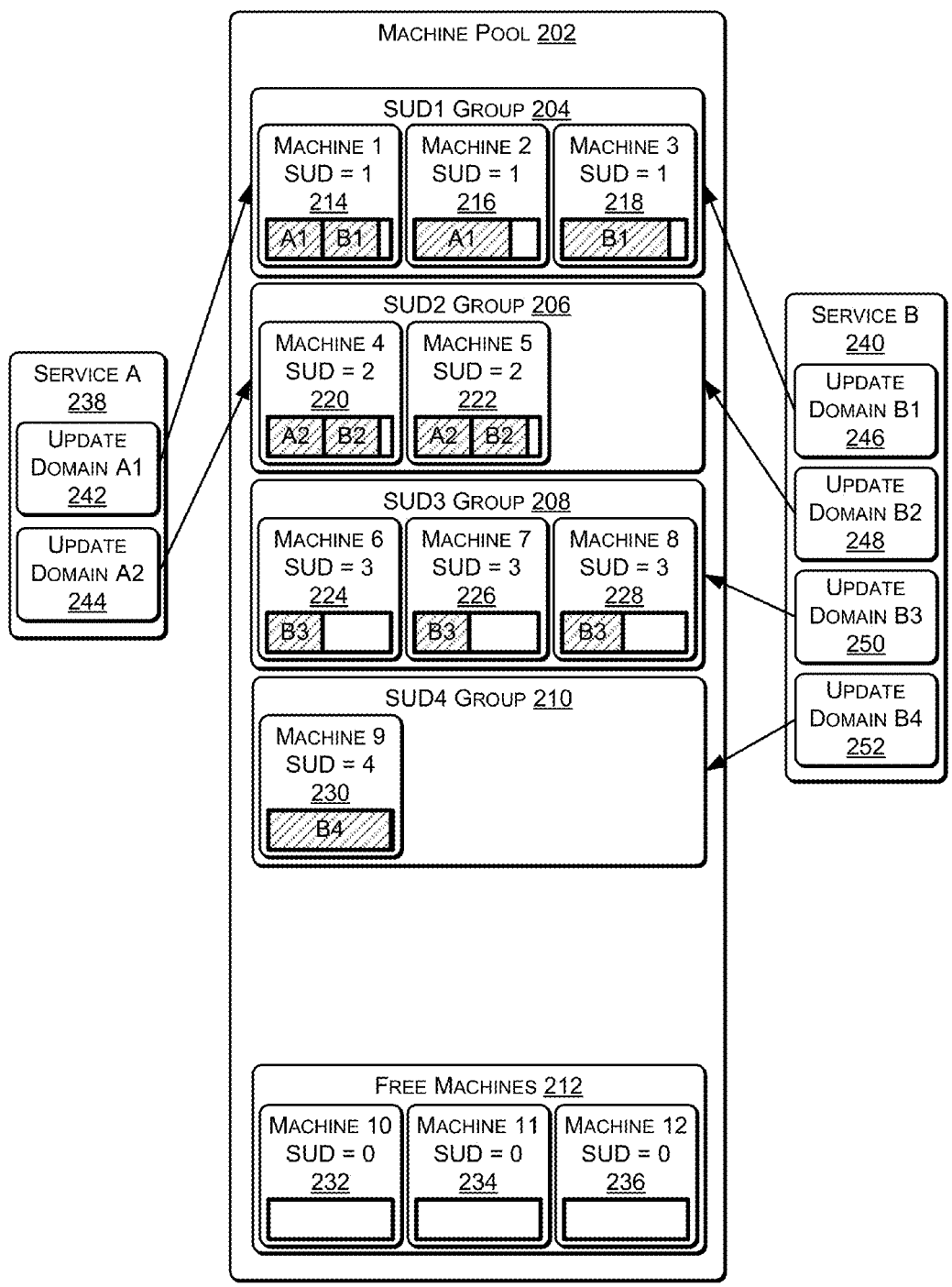
FIG. 2 is an example logical diagram of an illustrative allocation of instances of services according to some implementations.

FIG. 2 illustrates an example logical diagram 200 of the allocation of service instances amongst machines of a machine pool 202 (e.g., computing devices or servers). In particular, the machines of the machine pool 202 are illustrated as being assigned to one of four SUD groups: SUD1 group 204, SUD2 group 206, SUD3 group 208, SUD4 group 210 or a group of free machines 212. Specifically, as shown in FIG. 2, Machine 1 214, Machine 2 216 and Machine 3 218 are assigned to SUD1 group 204; Machine 4 220 and Machine 5 222 are assigned to SUD2 group 206; Machine 6 224, Machine 7 226 and Machine 8 228 are assigned to SUD4 group 208; Machine 9 230 is assigned to SUD4 group 210; and Machine 10 232, Machine 11 234 and Machine 12 236 are currently free machines 212 which are indicated in FIG. 2 as having a SUD=0. Of course, other implementations may use other SUD identifiers for the free machine group or may identify the free machines as a group of machines without SUD identifiers. The SUD number zero is used herein for simplicity and consistency.

FIG. 2 illustrates an example allocation of instances of Service A 238 and Service B 240, each including respective update domains, according a G-SUD technique. Service A 238 includes two update domains: update domain A1 242 and update domain A2 244. Service B 240 includes four update domains: update domain B1 246, update domain B2 248, update domain B3 250 and update domain B4 252. In the illustrated G-SUD techniques, resources permitting, instances from each update domain number are allocated to server update domain groups with the same number. This is illustrated for ease of visualization by the arrows leading from the update domains 242-252 to the SUDs 204-210. For example, instances belonging to update domain A1 242 and update domain B1 246 are allocated to the SUD1 group 204 which has a SUD=1; instances belonging to update domain A2 244 and update domain B2 248 are allocated to the SUD2 group 206 which has a SUD=2; instances belonging to update domain B3 250 are allocated to the SUD3 group which has a SUD=3; and instances belonging to update domain B4 252 are allocated to the SUD4 group 210 which has a SUD=4. Although not shown in the FIGS. for ease of illustration, it should be noted that many instances of an update domain of a service may be allocated or deployed to a machine.

The allocation of instances to individual machines is also illustrated in FIG. 2. In particular, FIG. 2 indicates that instances of update domain A1 242 are allocated to Machine 1 214 and Machine 2 216 and that instances of update domain B1 246 are allocated to Machine 1 214 and Machine 3 218. As illustrated, Machine 1 214, Machine 2 216 and Machine 3 218 each have an amount of computing resources reflected by a box below their respective reference numerals. The amount of resources being used is indicated by sub-boxes labeled with an update domain identifier of the hosted instances and cross-hatching. Free computing resources are indicated as whitespace within the resource boxes. Similar allocations are illustrated with regard to SUD groups 206-210.

At the point illustrated in FIG. 2, Machine 10 232, Machine 11 234 and Machine 12 236 are free machines 212 that each may be allocated to one of SUD groups 204-210 or to additional SUD groups such as in the case of a service requesting greater than four update domains or in the case of fragmentation of the update domains into other server update domains due to, for example, high utilization of the machine pool 202. The handling of such a fragmentation scenario is described with respect to FIG. 3 below.

Figure 3:
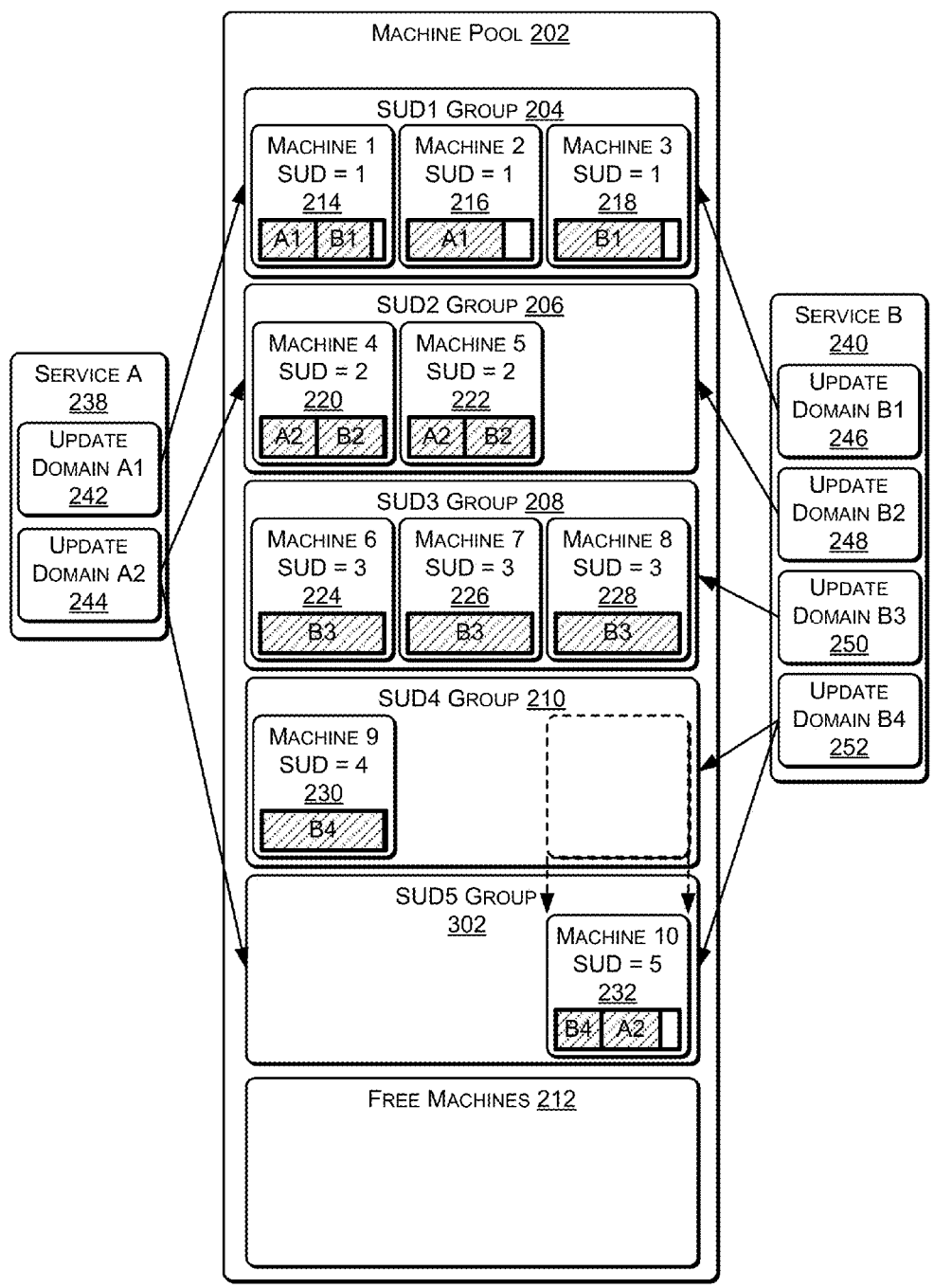
FIG. 3 is an example logical diagram of an illustrative allocation of instances of services according to some implementations.

FIG. 3 illustrates a possible state of the machine pool 202 subsequent to that shown in FIG. 2 in which additional resources have been requested by service A 238 and service B 240. For ease of illustration, Machine 11 234 and Machine 12 236 are not included in FIG. 3.

Prior to the state shown in FIG. 3, update domain B4 252 requested additional instances be allocated, with the result being that Machine 10 232 was assigned to SUD4 group 210 and an instance of update domain B4 252 was instantiated thereon. As such, no free machines 212 remain available.

At the point illustrated in FIG. 3, update domain A2 244 has requested the instantiation of an additional instance. However, Machine 4 220 and Machine 5 222 have insufficient free computing resources to host the requested additional instance. Because no free machines 212 are available, the allocation and maintenance mechanism searches to locate a machine which has the desired computing resources and which will not be in violation of update domain constraints should the additional instance from update domain A2 244 be allocated thereto. In FIG. 3, Machine 10 232, which is currently assigned to SUD=4, has the desired computing resources free to host the additional instance of update domain A2 244 and does not already host an instance of service A 238 which would cause a violation of the update domain constraints should the additional instance of update domain A2 244 be allocated to it.

Upon determining that Machine 10 232 can host the additional instance, the allocation mechanism moves Machine 10 232, to a newly formed SUDS group 302, and allocates the additional instance of update domain A2 244 to Machine 10 232. This is shown in FIG. 3 by dashed lines. In some implementations, the allocation mechanism moves the "fragmented" machine to a SUD having a smallest SUD number such that no update domain constraints are violated.

Other additional features may be provided in some implementations. For example, some implementations may provide an additional maintenance mechanism. For example, some implementations may provide a mechanism to determine, when an instance is removed, whether the machine remains fragmented. If the machine is still fragmented, i.e., the machine is still allocated instances with different update domain numbers, the mechanism operates to determine if there is an SUD of a lower number to which the machine can be shifted without causing a violation of the update domain constraints. If the machine becomes un-fragmented, i.e. the instances remaining allocated to the machine are of update domains with the same number, the machine may be assigned into the SUD whose number is equal to that of the update domains of the instances the machine is hosting. If the machine is shifted out of its current SUD and the machine was the last machine with this SUD, the mechanism may then shift the SUD of all machines with SUD numbers higher than the now empty SUD down by one.

Figure 4:
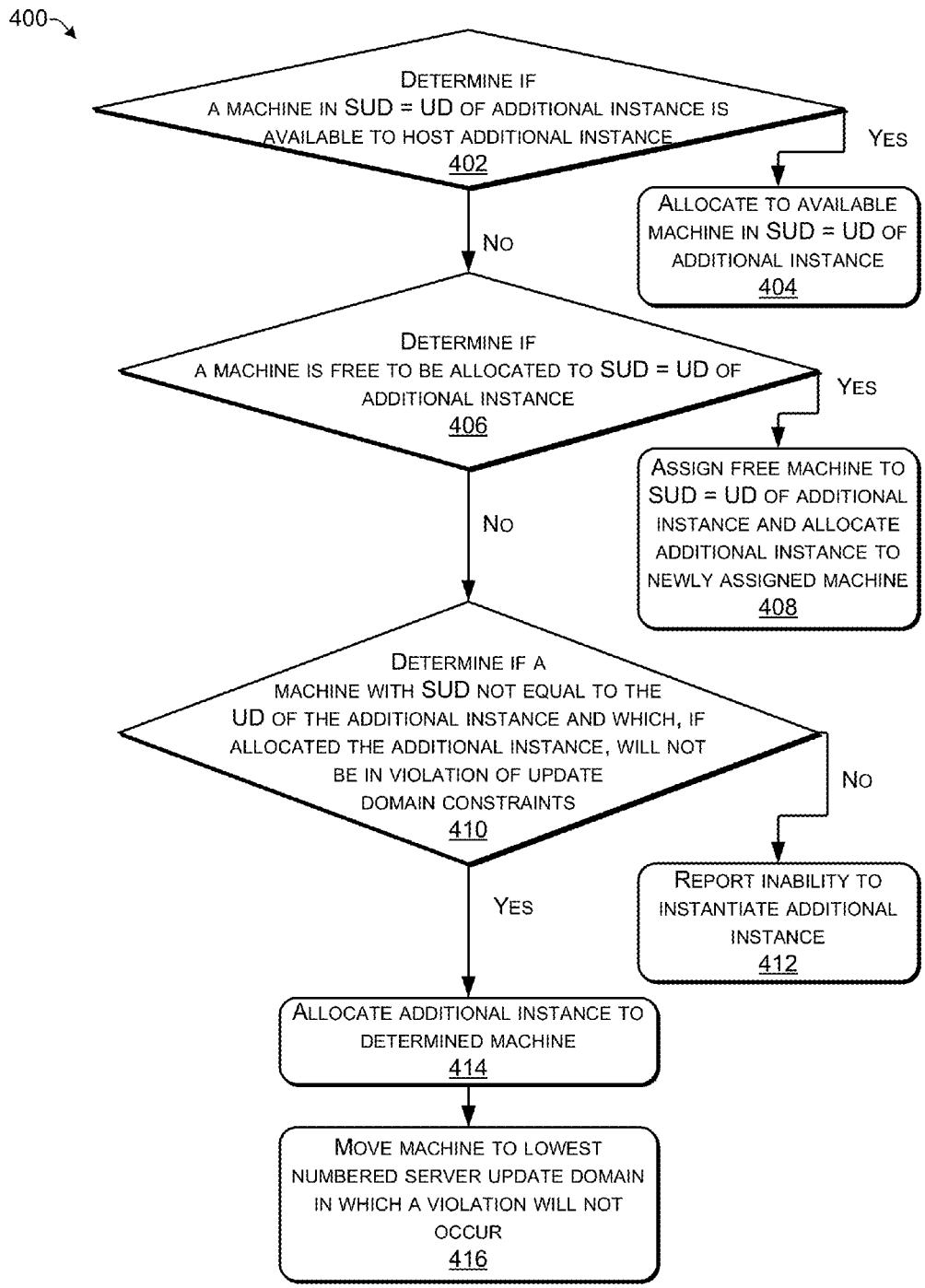
FIG. 4 is a flow diagram of an illustrative process to perform the allocation of instances of services according to some implementations.

FIG. 4 illustrates an example process flow 400 according to some implementations. In this particular case, the process flow illustrates the process of the allocating instances to machines and server update domains in a G-SUD implementation. In the flow diagrams of FIG. 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process flow 400 is described with reference to the system 100 and 200, described above, although other models, frameworks, systems and environments may implement the illustrated process. Other processes described throughout this disclosure (e.g. FIGS. 5 and 8-10), in addition to process 400, shall also be interpreted accordingly.

In some implementations, prior to conducting process flow 400, the system may determine a set of candidate machines which satisfy a minimum level of suitability to host the additional instance. For example, the system may determine a set of machines that satisfy utilization constraints, disk space constraints, and fault-domain constraints as the set of candidate machines.

At block 402, the allocation and maintenance mechanism receives a request that an additional instance be instantiated for a particular update domain of the service. The allocation mechanism then determines if a machine in the server update domain having a server update domain number equal to the update domain number of the requested additional instance is available to host the additional instance. If there is an available machine with the SUD number equal to the update domain number of the requested additional instance, the process continues to block 404. Otherwise, the process continues to block 406.

At block 404, the allocation and maintenance mechanism allocates the additional instance to be available machine with the server update domain number equal to the update domain number of the additional instance. This completes the process.

At block 406, the allocation and maintenance mechanism determines if a machine is free to be allocated to the server update domain having a SUD number equal to the update domain number of the additional instance. If so, the process continues to block 408. Otherwise, the process continues to block 410.

At block 408, the allocation and maintenance mechanism assigns the free machine to the server update domain with the server update domain number equal to the update domain number of the additional instance and allocates the additional instance to the newly assigned machine. This completes the process.

At block 410, the allocation and maintenance mechanism determines if there is a machine in a SUD with a SUD number not equal to the UD number of the additional instance but which, if allocated the additional instance, will not be in violation of the update domain constraints. If not, the process continues to block 412. If so, the process continues to block 414.

At block 412, the allocation and maintenance mechanism reports its inability to instantiate an additional instance. The process is then complete.

At block 414, the allocation and maintenance mechanism allocates the additional instance to the machine determined in block 410. As a result, the machine is fragmented, i.e., the machine has instances from two or more services with different update domain numbers. At block 416, the allocation and maintenance mechanism moves the fragmented machine allocated the additional instance to the lowest numbered server update domain in which a update domain violation will not occur. In some implementations, the allocation and maintenance mechanism may move the fragmented machine to a server update domain having a number greater than a number N. For example, some implementations may move fragmented machines to server update domains having a number greater than N, where N is equal to the maximum number of update domains of any service operating on the machines of the machine pool 202. Of course, this is not limiting and other implementations may use different numbers or determinations for N. This completes the process.

The above discussion of the process flow 400 shown in FIG. 4 provides indications of operations after the determination of which machine to allocate the additional instance to and allocating the additional instance to the determined machine. However, in some implementations, these subsequent operations may be performed by a different process or by a different controller mechanism, e.g. the maintenance mechanism described below with respect to FIG. 5.

Figure 5:
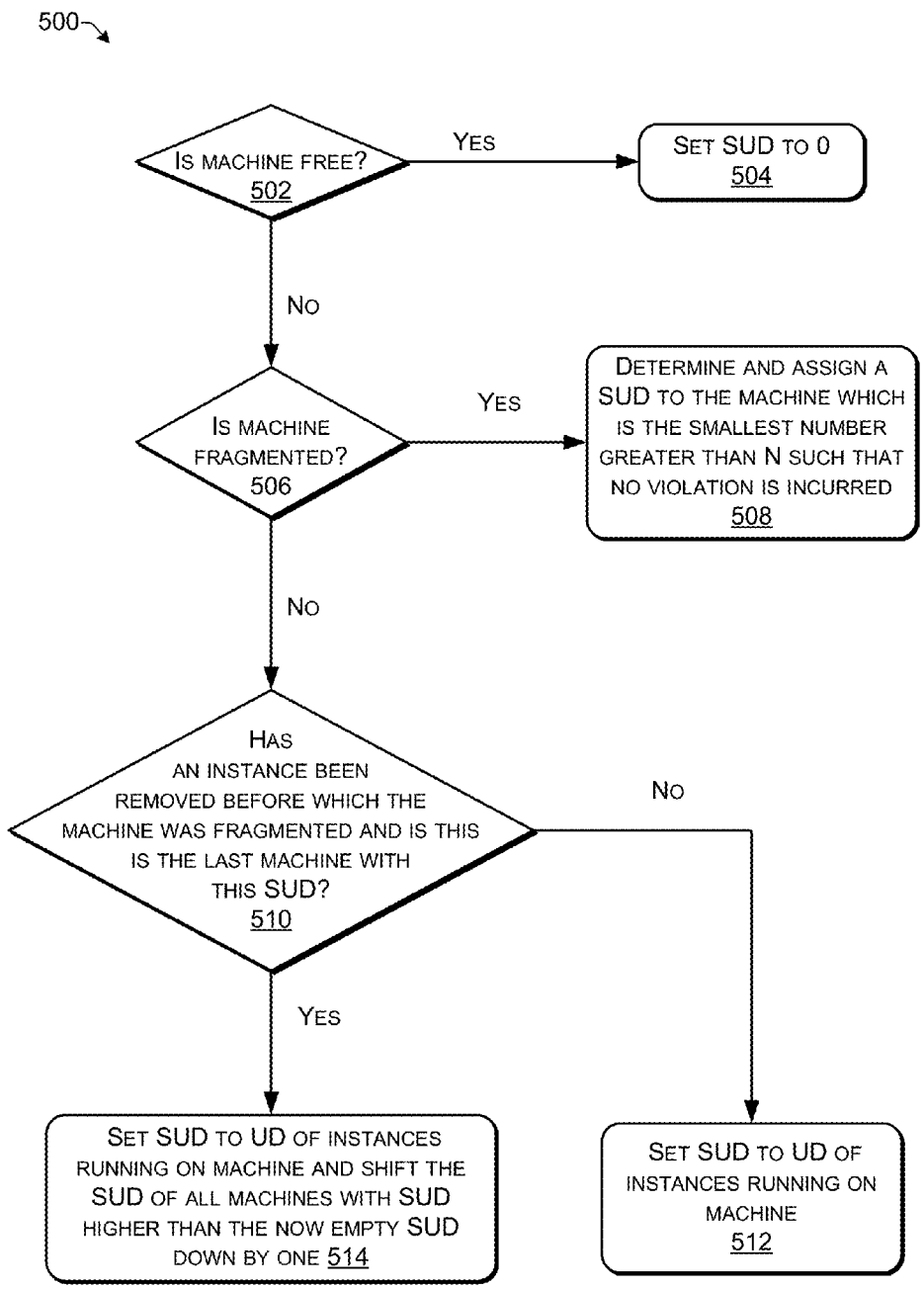
FIG. 5 is a flow diagram of an illustrative process to perform maintenance of a server update domain for a machine according to some implementations.

FIG. 5 illustrates an example process flow 500 according to some implementations. In this particular case, the process flow illustrates the maintenance of the server update domain assignment of a particular machine in a G-SUD implementation. Such a maintenance process may be conducted periodically or the process may be initiated manually or even based on triggering events. Possible triggering events may include the addition of an instance, the removal of an instance, or any other event that may have an impact on the SUD groups to which the machine may be assigned.

At block 502, the allocation and maintenance mechanism determines if the machine is free. If so, the process continues to block 504. Otherwise, the process continues to block 506.

At block 504, the allocation and maintenance mechanism sets the server update domain number of the machine to zero, thereby moving the machine to the free machines group 212. This completes the process. As noted above, the SUD number zero is used herein for simplicity and consistency. Other implementations may use other SUD identifiers for the free machine group or may identify the free machines as a group of machines without SUD identifiers.

At block 506, the allocation and maintenance mechanism determines if the machine is fragmented. If so, the process continues to block 508. Otherwise, the process continues to block 510.

At 508, the allocation and maintenance mechanism determines and assigns a SUD number to the fragmented machine which is the smallest number greater than N such that no violation of the update domain constraints is incurred. The N used for the determination may be that discussed above with respect to block 416 of FIG. 4. This completes the process.

At block 510, the allocation and maintenance mechanism determines if an instance has been removed before which the machine was fragmented (but now the machine is not fragmented), and whether this is the last machine with the current SUD number. If not, the process continues to block 512. If both are so, the process continues to block 514.

At block 512, the allocation and maintenance mechanism sets the SUD number of the machine to the UD number of the instances running on the machine. As the machine is not fragmented, all instances operating on the machine should have the same UD number. This completes the process.

At block 514, the allocation and maintenance mechanism sets the SUD number of the machine to the UD number of the instances running on the machine. As mentioned above, as the machine is not fragmented, all instances operating on the machine should have the same UD number. Because this machine was the last machine with the prior SUD number, the allocation and maintenance mechanism may also shift the SUD number of all machines with an SUD number higher than the now empty SUD down by one. This completes the process.

Process flows 400 and 500 shown in FIGS. 4 and 5 can be implemented with many variations that would be apparent to one of ordinary skill in the art in view of the disclosure provided herein. One aspect that can be varied is whether the steps are performed sequentially or in parallel. Another variation may involve the order of the various determinations and/or which rules or tests are used in allocation and maintenance determinations. These and other variations on the implementation of the allocation and maintenance mechanism and process in G-SUD implementations would be apparent to one of ordinary skill in the art in view of the disclosure herein.

Figure 6:
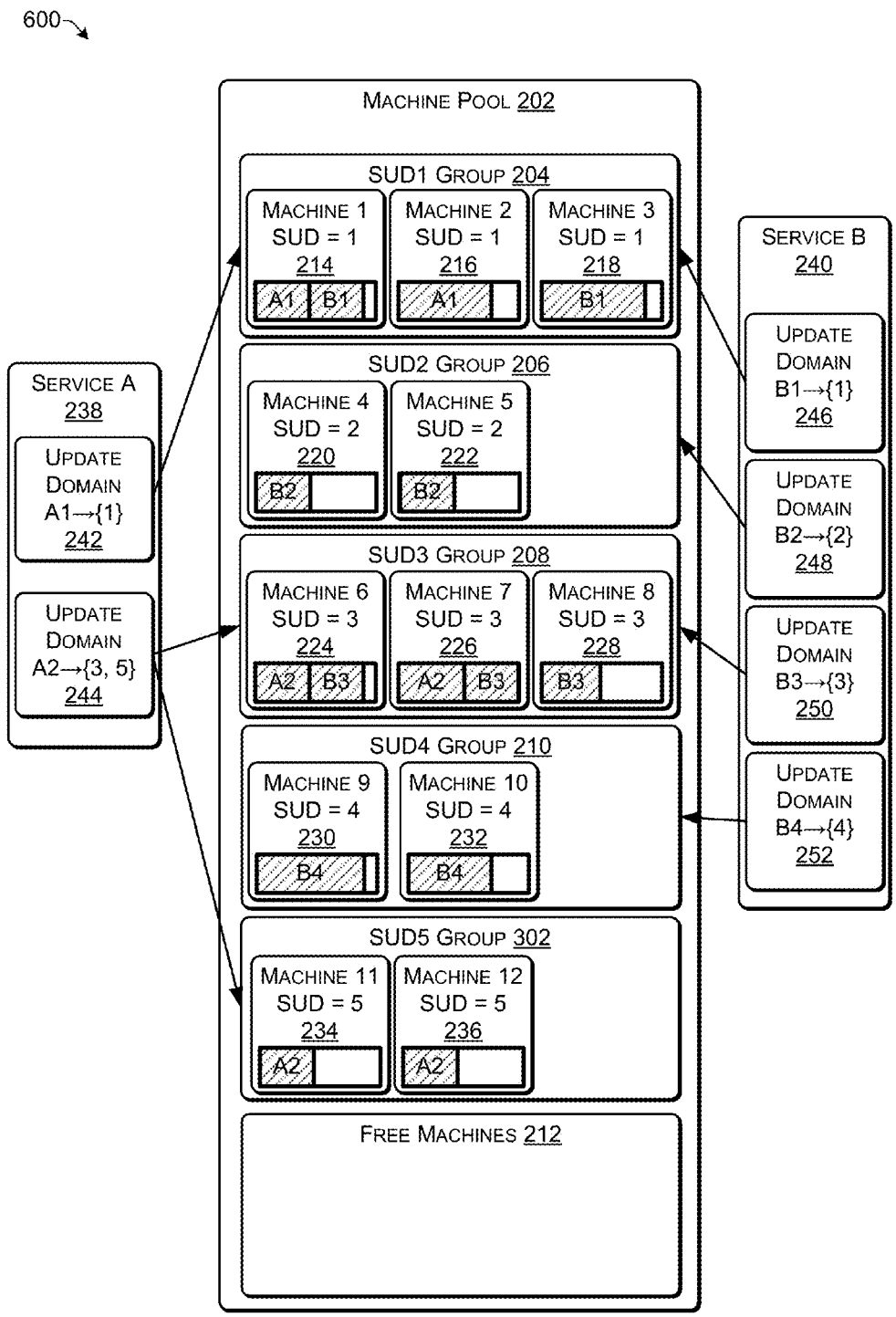
FIG. 6 is an example logical diagram of an illustrative allocation of instances of services according to some implementations.
Figure 7:
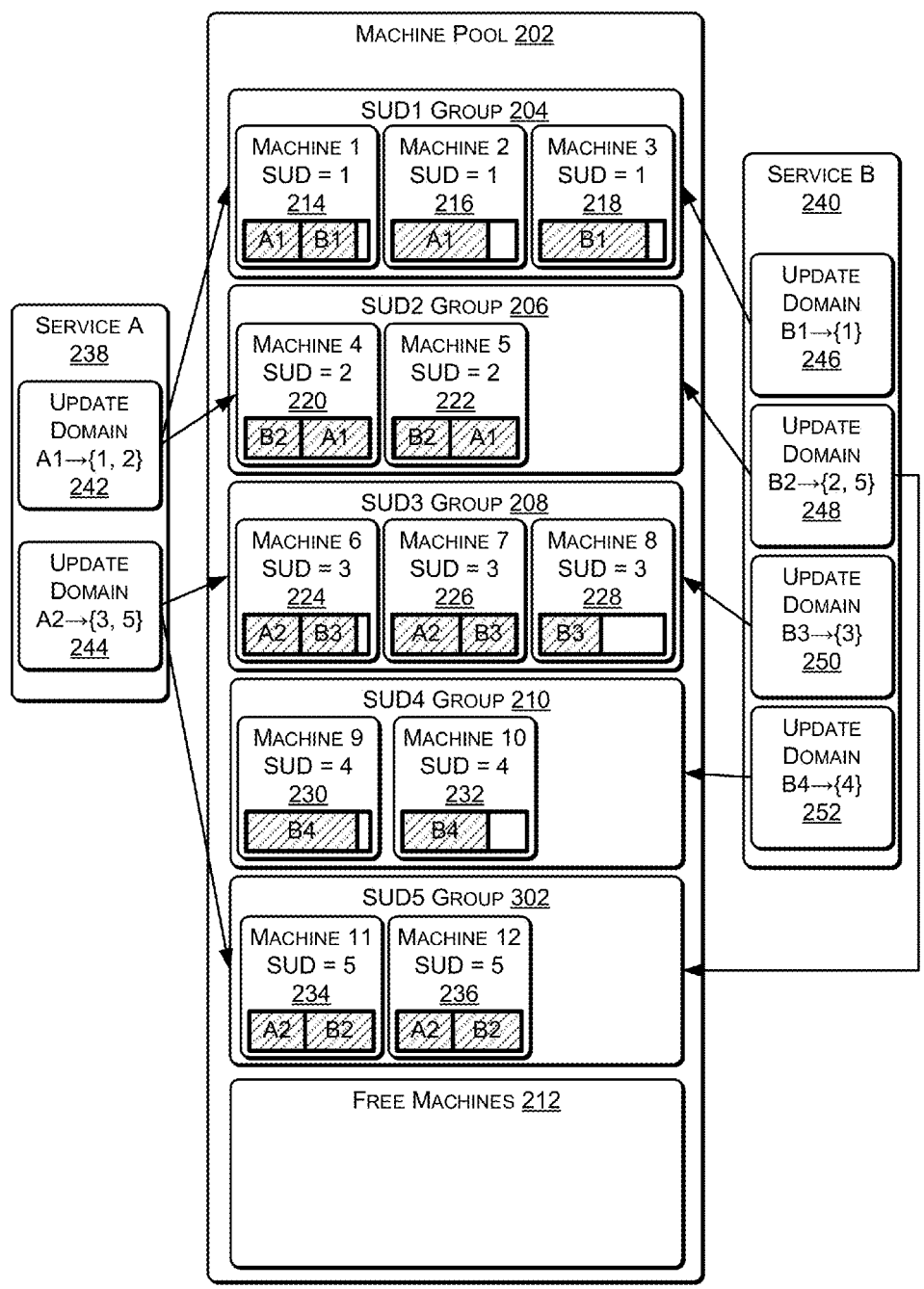
FIG. 7 is an example logical diagram of an illustrative allocation of instances of services according to some implementations.

FIG. 6 illustrates another example logical diagram of the allocation of instances of services amongst machines of the machine pool 202. In particular, in FIGS. 6-7, a per-service-update domain (PS-SUD) allocation and maintenance mechanism is used to allocate instances of service A 238 and service B 240 to the machines of the machine pool 202. As mentioned above, a PS-SUD allocation and maintenance mechanism does not necessarily employ a global allocation of all instances of all applications to SUDs with a SUD number equal to the UD of each of the instances (where possible). Rather, the PS-SUD allocation and maintenance mechanism maintains a "per-service" mapping from each of the update domain of the service to one or more server update domains of the machine pool 202. In FIGS. 6-7, this is indicated by an inclusion of the mapping in the update domain blocks. For example, in FIG. 6, the block labeled "update domain A2 244" includes the mapping "Update Domain A2→{3,5}" to indicate that update domain A2 maps to server update domains three (3) and five (5), i.e., SUD3 group 208 and SUD5 group 302. For the purposes of the following discussion, the mappings of update domain A1 242 and update domain B2 248 shown in FIG. 6 should be noted for comparison with FIG. 7. In particular, as shown in FIG. 6, update domain A1 242 maps to SUD1 group 204 and update domain B2 248 maps to SUD2 group 206.

FIG. 7 illustrates a possible state of the machine pool 202 subsequent to that shown in FIG. 6 in which additional resources have been requested by service A 238 and service B 240. In particular, additional instances have been requested for update domain A1 242 and then for update domain B2 248.

In operation, upon receiving the request for one or more additional instances of update domain A1 242, the allocation and maintenance mechanism determines that the SUD1 group to which update domain A1 is mapped at the point shown in FIG. 6 does not have the resources available to host the one or more additional instances of update domain A1 242. The allocation and maintenance mechanism then determines that no free machines 212 are available. Upon finding no free machines 212 are available, the allocation and maintenance mechanism determines whether there is at least one machine assigned to an SUD group which is not mapped to another service A update domain instance and which has the resources to fulfill the request. In the illustrated state shown in FIG. 6, the allocation and maintenance mechanism determines that SUD2 group 206 is not currently mapped to service A 238 and that Machine 4 220 and Machine 5 222 of the SUD2 group 206 have the available resources to fulfill the request. The allocation and maintenance mechanism then maps SUD2 group 206 to update domain A1 242 and allocates the requested one or more instances of update domain A1 to Machine 4 220 and Machine 5 222.

Subsequent to the mapping of SUD2 group 206 to update domain A1 242, the allocation and maintenance mechanism receives a request from service B for additional instances of update domain B2 240. As shown in FIG. 7, the machines of SUD2 group 206 to which update domain B2 is mapped, do not have the free resources to enable additional instances be hosted. Specifically, the resources mapped to the additional instances of update domain A1 242 have consumed all the resources available on Machine 4 220 and Machine 5 222. As such, the allocation and maintenance mechanism again determines whether there are any free machines 212 or whether there is at least one machine assigned to a SUD group which is not hosting instances of another service B update domain and which has the resources to fulfill the request. Of course, in the case of multiple additional instances being requested for an update domain simultaneously, multiple machines of the same or different SUD groups may be used and preference may be given to machines which have the resources available to host all the requested additional instances. In the illustrated state shown in FIG. 6, the allocation and maintenance mechanism determines that SUDS group 302 is not currently mapped to service B 240 and that Machine 11 234 and Machine 12 236 of the SUDS group 302 have the available resources to fulfill the request. Accordingly, the allocation and maintenance mechanism allocates one or more instances of update domain B2 to Machine 11 234 and Machine 12 236.

Figure 8:
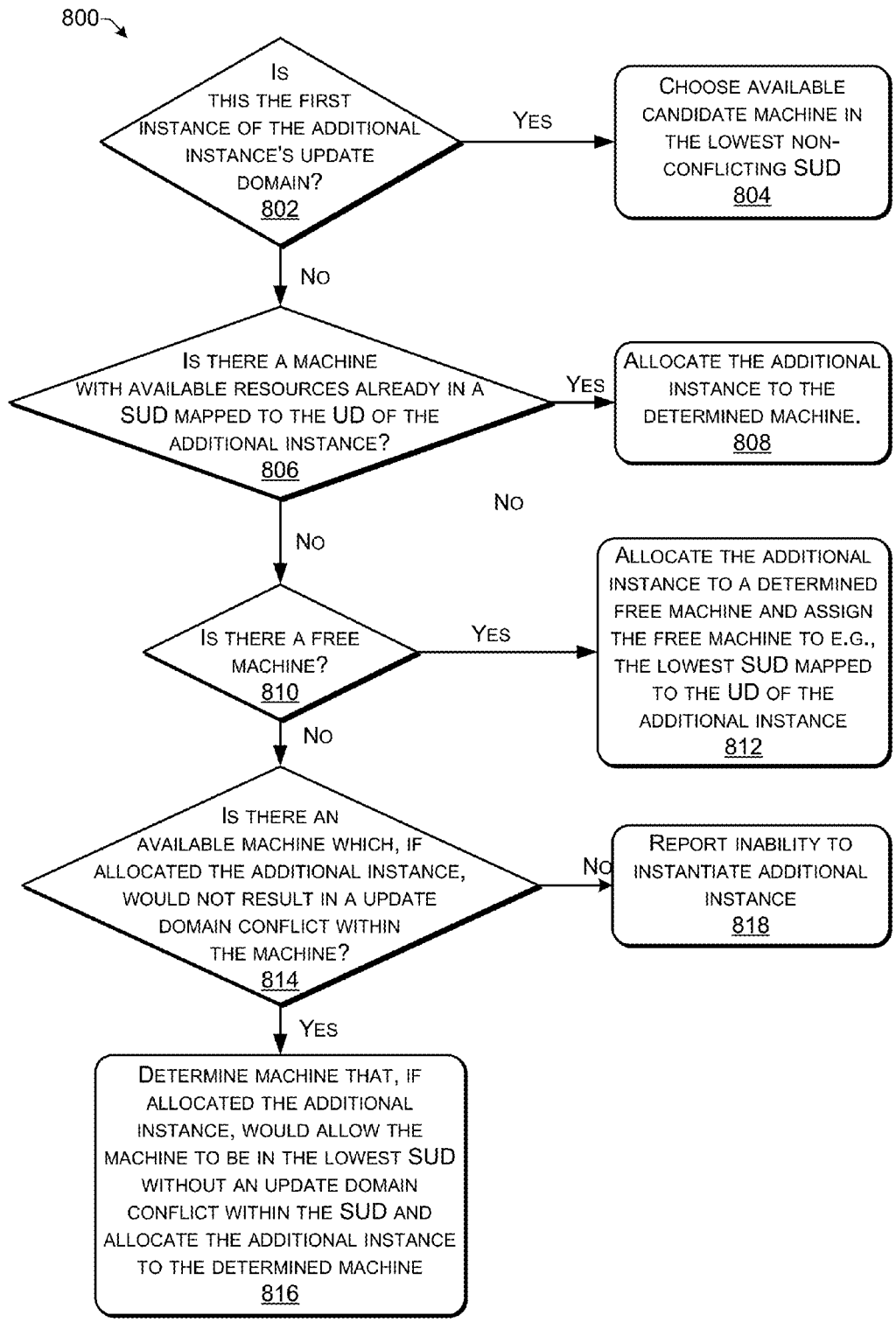
FIG. 8 is a flow diagram of an illustrative process to perform the allocation of instances of services according to some implementations.

FIG. 8 illustrates an example process flow 800 according to some implementations. In this particular case, the process flow illustrates the process of the allocating instances to server update domains in a PS-SUD implementation. In some implementations, prior to the process flow 800, the system determines a set of candidate machines which satisfy a minimum level of suitability to host the instance. For example, the system may determine a set of machines that satisfy utilization constraints, disk space constraints, and fault-domain constraints as the set of candidate machines.

At block 802, the allocation and maintenance mechanism determines if the additional instance is the first instance of the additional instance's service update domain. If so, the process flow continues to block 804. Otherwise, the process continues to block 806.

At block 804, the allocation and maintenance mechanism chooses a candidate machine in the lowest non-conflicting SUD available. The process is then complete.

At block 806, the allocation and maintenance mechanism determines if there is a machine with available resources already in an SUD mapped to the additional instance's service update domain. If so, the process flow continues to block 808. Otherwise, the process continues to block 810.

At block 808, the allocation and maintenance mechanism allocates the additional instance to the determined machine. The process is then complete.

At block 810, the allocation and maintenance mechanism determines if there is a free machine. If so, the process flow continues to block 812. Otherwise, the process continues to block 814.

At block 812, the allocation and maintenance mechanism allocates the additional instance to a free machine. The allocation and maintenance mechanism then assigns the free machine to, for example, the lowest SUD mapped to the additional instance's update domain. The process is then complete.

At block 814, the allocation and maintenance mechanism determines if there is a machine available that, if allocated the additional instance, would not have an update domain constraint violation within the machine itself. If so, the process flow continues to block 816. Otherwise, the process continues to block 818.

At block 816, the allocation and maintenance mechanism determines a machine that, if allocated the additional instance, would allow the machine to be assigned to the lowest SUD without an update domain constraint violation within the SUD. The allocation and maintenance mechanism then allocates the additional instance to the determined machine and, in some cases, assigns the determined machine to the determined lowest SUD. The process is then complete.

At block 818, the allocation and maintenance mechanism reports its inability to instantiate the additional instance. The process is then complete.

While the above discussion and the process flow shown in FIG. 8 provide indications of operations other than the determination of which machine to allocate the additional instance to and allocating the additional instance to the determined machine, these subsequent operations may be performed by a different process or by a different controller mechanism, e.g. the maintenance mechanism described below with respect to FIG. 9.

Figure 9:
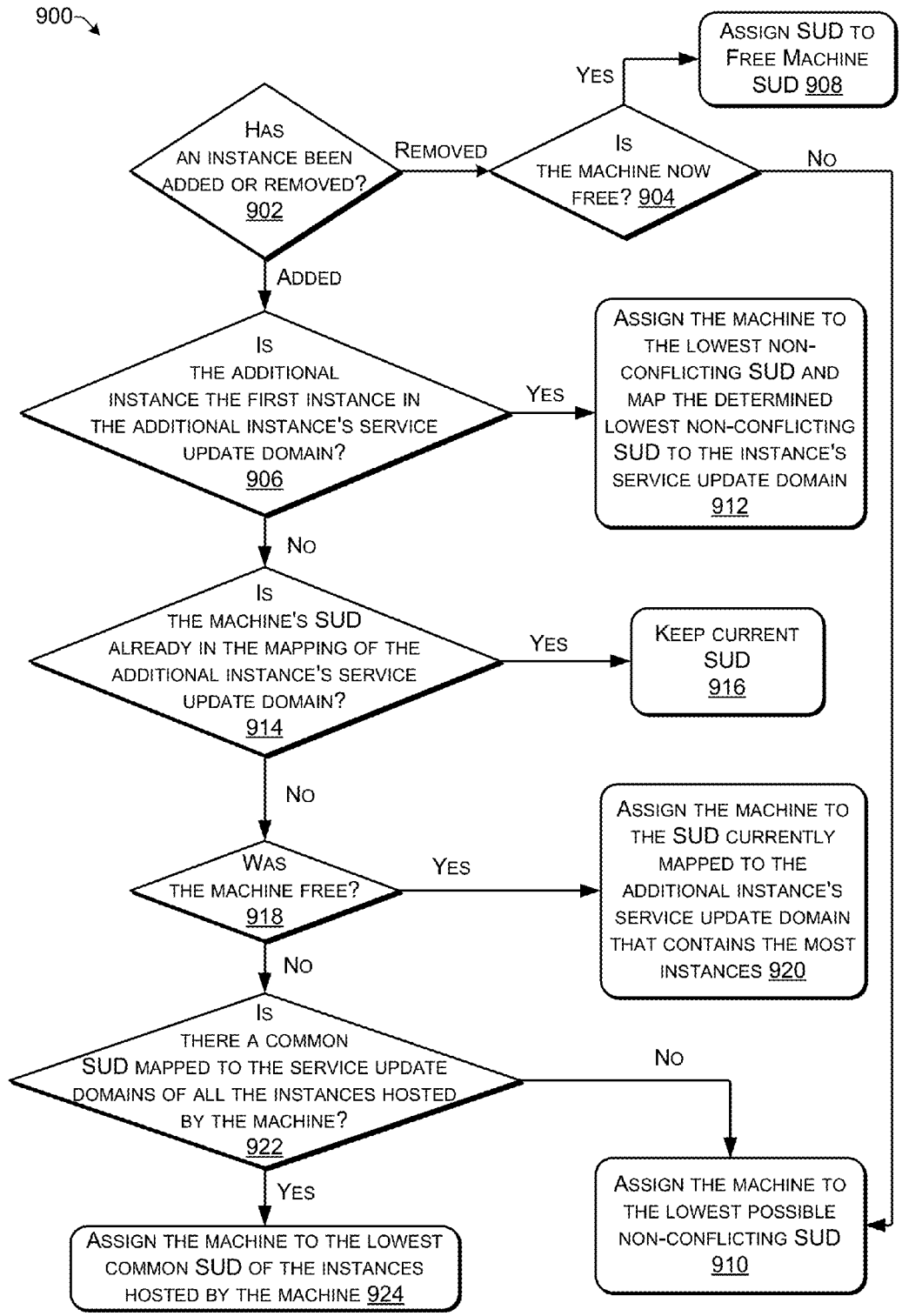
FIG. 9 is a flow diagram of an illustrative process to perform maintenance of a server update domain a machine according to some implementations.

FIG. 9 illustrates an example process flow 900 according to some implementations. In this particular case, the process flow illustrates the process for maintaining the server update domain number of a machine in a PS-SUD implementation. Such a maintenance process may be conducted periodically or the process may be initiated manually or even based on triggering events. Possible triggering events may include the addition of an instance, the removal of an instance, or any other event that may have an impact on the SUD groups to which the machine may be assigned.

At 902, the allocation and maintenance mechanism determines if an instance has been added or removed from the machine. If an instance has been removed, the process continues to block 904. If an instance has been added, the process continues to block 906.

At block 904, the allocation and maintenance mechanism determines if the machine is now free. If so, the process continues to block 908. Otherwise, the process continues to block 910.

At block 908, the allocation and maintenance mechanism assigns the now free machine to the free machine SUD group. This completes the process.

At block 910, the allocation and maintenance mechanism assigns the machine to the lowest possible non-conflicting SUD. This completes the process.

Returning to block 906, the allocation and maintenance mechanism determines if the additional instance is the first instance in the additional instance's service update domain. If so, the process continues to block 912. Otherwise, the process continues to block 914.

At block 912, the allocation and maintenance mechanism assigns the machine to the lowest non-conflicting SUD and maps the determined lowest non-lee conflicting SUD to the additional instance's service update domain. This completes the process.

At block 914, the allocation and maintenance mechanism determines if the machine's SUD is already mapped to additional instance's service update domain. If so, the process continues to block 916. Otherwise, the process continues to block 918.

At block 916, the allocation and maintenance mechanism keeps the SUD of the machine unchanged. This completes the process.

At block 918, the allocation and maintenance mechanism determines if the machine was free prior to the allocation of the additional instance. If so, the process continues to block 920. Otherwise, the process continues to block 922.

At block 920, the allocation and maintenance mechanism assigns the machine to the SUD already mapped to the additional instance's service update domain that contains the most instances of the additional instance's service. This completes the process.

At block 922, the allocation and maintenance mechanism determines if there is a common SUD mapped to the service update domains of all the instances hosted by the machine. If so, the process continues to block 924. Otherwise, the process continues to block 910 which complets the process as discussed above.

At block 924, the allocation and maintenance mechanism assigns the machine to the lowest common SUD mapped to the service update domains of the instances hosted by the machine. This completes the process.

As a general matter, the SUD-based allocation and maintenance techniques discussed above may be modified or reorganized based on the particular implementation. As such, the techniques discussed above should not be taken as limiting. From the discussion above, several allocation and maintenance rules that may be (but are not required to be) used in any given SUD-based allocation and maintenance technique. Some of these rules are summarized below.

One possible rule, termed herein as an existing SUD rule, may select the machines whose SUD is already in the additional instance's service update domain SUD mapping. The existing SUD rule also select, as a second choice, a free machine, rather than a machine already hosting instances that is not within the additional instance's service update domain SUD mapping.

Another possible rule, termed herein the common UD rule, may select machines that are hosting instances with the same UD number as the additional instance, without regard to what service the hosted instances belong. One implementation of the common UD rule is used in the global-SUD allocation technique discussed above. There, the common UD rule may select machines with an SUD equal to the UD of the additional instance, which is equivalent to selecting machines hosting other instances that have the same UD as the additional instance. In some implementations, the common UD rule may, as a secondary choice, may select machines in SUDs that host instances with fewer distinct UD numbers.

A third possible rule, termed herein the lowest SUD rule, may select machines that can be assigned to the lowest "resulting SUD" by the SUD allocation and maintenance algorithm being used by the implementation. Herein, the lowest "resulting SUD" refers to the lowest SUD to which the machine will be assignable if the additional instance is allocated to the machine. If there are equal choices of machines, the lowest SUD rule may select machines that minimize any SUD move up, i.e., the increase of the SUD number of the machine is minimized Implementations of the lowest SUD rule were discussed above with regard to both the G-SUD and the PS-SUD allocation and maintenance mechanisms. For example, block 816 employed a form of the lowest SUD rule by choosing the machine that, if allocated the additional instance, is able to be assigned the lowest SUD without an update domain constraint conflict.

A fourth possible rule, termed herein the "batch rule," may select machines that can host all, or the greatest number, of a group of additional instances that are to be allocated for an update domain of a service, such as a newly deployed service.

The possible rules discussed above may or may not be used in any particular SUD-based allocation and maintenance implementation and thus should not to be taken as limiting. Further, the order in which the rules are applied to a set of candidate machines may vary based on the details of the implementation. Thus, some implementations may execute the existing SUD rule and use the batch rule as a "tie-breaker" while other implementations may do the opposite. Of course, as stated above, some implementations may employ both the existing SUD rule and the batch rule, one rule or the other, or neither. This applies for any combination of the above discussed rules. These and other variations on the implementation of the particulars of the allocation and maintenance techniques would be apparent to one of ordinary skill in the art in view of the disclosure herein.

The system, having established the server update domains (SUDs), may invoke an update process employing the SUDs. Such an update process is illustrated in FIG. 10.

Figure 10:
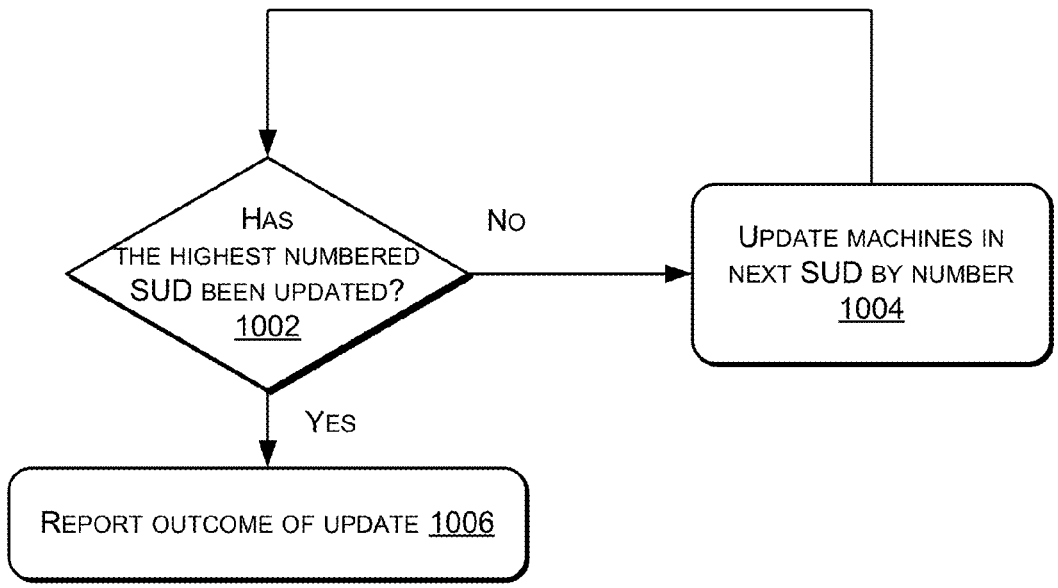
FIG. 10 is a flow diagram of an illustrative process to perform an update of a plurality of machines according to some implementations.

FIG. 10 illustrates an example process flow 1000 for providing an update mechanism to the machines 102-1, 102-2 through 102-N of the distributed computation service 102. In particular, process flow 1000 uses the SUDs allocated by the allocation and maintenance mechanism described above with respect to FIGS. 2-9. The update process may be invoked whenever a planned outage occurs and machines are to be rebooted, either because of a service-update, or a host OS update. In the latter case, all of the machines may be rebooted in such a way that the UD constraints of all services are satisfied.

At block 1002, the update mechanism determines whether the highest numbered SUD has been updated. If not, the process flow continues to block 1004. Otherwise, the process flow continues to block 1006.

At block 1004, the update mechanism executes an update of the machines in the next SUD by numeric order. Depending on the details of a given implementation, other machines in other SUDs may be updated simultaneously or other orderings of the SUDs may be used. Upon completion of the update of the machines in the current SUD, the process flow returns to block 1002.

At block 1006, the update mechanism has completed the update of the machines and prepares a report of the outcome of the update. The process is then complete. It should be noted that, depending on the implementation, the preparation of a report of the outcome of the update may not be performed, may be performed throughout the update process or partially performed.

The process set forth in FIG. 10 is of a type termed herein "a pure SUD-based" update process. As stated above, implementations are not limited to such a process. Below, some alternative update processes are discussed. These and other variations on the implementation of the particulars of the update technique would be apparent to one of ordinary skill in the art in view of the disclosure herein.

In some implementations, a more aggressive SUD-based update mechanism may be employed. The mechanism contains two steps. First, like the pure SUD-based update algorithm of FIG. 10, it adds all machines with the SUD currently selected for updating to a ready-to-update list. However, the mechanism also adds to this list any additional non-conflicting machines from other SUD groups. Specifically, the mechanism looks at all remaining machines with different SUDs in a given order (e.g., randomly or by SUD) and adds any non-conflicting machines to the ready-to-update list.

In other implementations, a pipelined SUD-based update mechanism may be used that is in between the pure SUD-based update mechanism and the aggressive SUD-based update mechanism. The mechanism works as follows. When SUD=1 is selected for update, instead of trying to add additional machines to the ready-to-update list from all other SUD groups (which is what the aggressive SUD-based process does), the pipelined SUD-based process may try to add SUD=2 machines to the ready-to-update list, i.e., non-conflicting machines from the next SUD to be updated.

Still other implementations may use a conflict-based heuristics for ordering machines to be updated. In some implementations, the order in which the machines are considered to be updated (or added to the ready-to-update list) matters, e.g. with regard to efficiency. Two examples are a "most conflicted" machine first approach and a "least conflicted" machine first approach. As the names imply, such approaches order the machines for update (or the SUDs to which the machines are assigned) based on the amount of update domain conflicts the machines have with machines in other SUDs.

While several examples have been illustrated herein for discussion purposes, numerous other configurations may be used and thus implementations herein are not limited to any particular configuration or arrangement. For example, the discussion herein refers to mappings from service update domains to server update domains being used in the allocating of instances of the services to machines. This should not be taken as a limitation as such mappings need not necessarily be included. For example, the allocation and maintenance mechanism may maintain a data structure including the server update domains to which the machines are assigned but the allocation technique may consider only the lowest SUD rule by which the instance is allocated to an available machine that may be assigned to the lowest SUD without update domain constraint violations being incurred. In other words, the lowest SUD rule may be used without mapping from service-UD to SUD, either global or per-service. Other variations in the logical and practical structure and framework of various implementations would be apparent to one of ordinary skill in the art in view of the disclosure provided herein.

The processes described herein are only examples provided for discussion purposes. Numerous other variations will be apparent to those of skill in the art in light of the disclosure herein. Further, while the disclosure herein sets forth several examples of suitable frameworks, architectures and environments for executing the techniques and processes herein, implementations herein are not limited to the particular examples shown and discussed. The processes illustrated herein are shown as a collection of operations in a logical flow graph, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed.

EXAMPLE COMPUTING DEVICE

Figure 11:
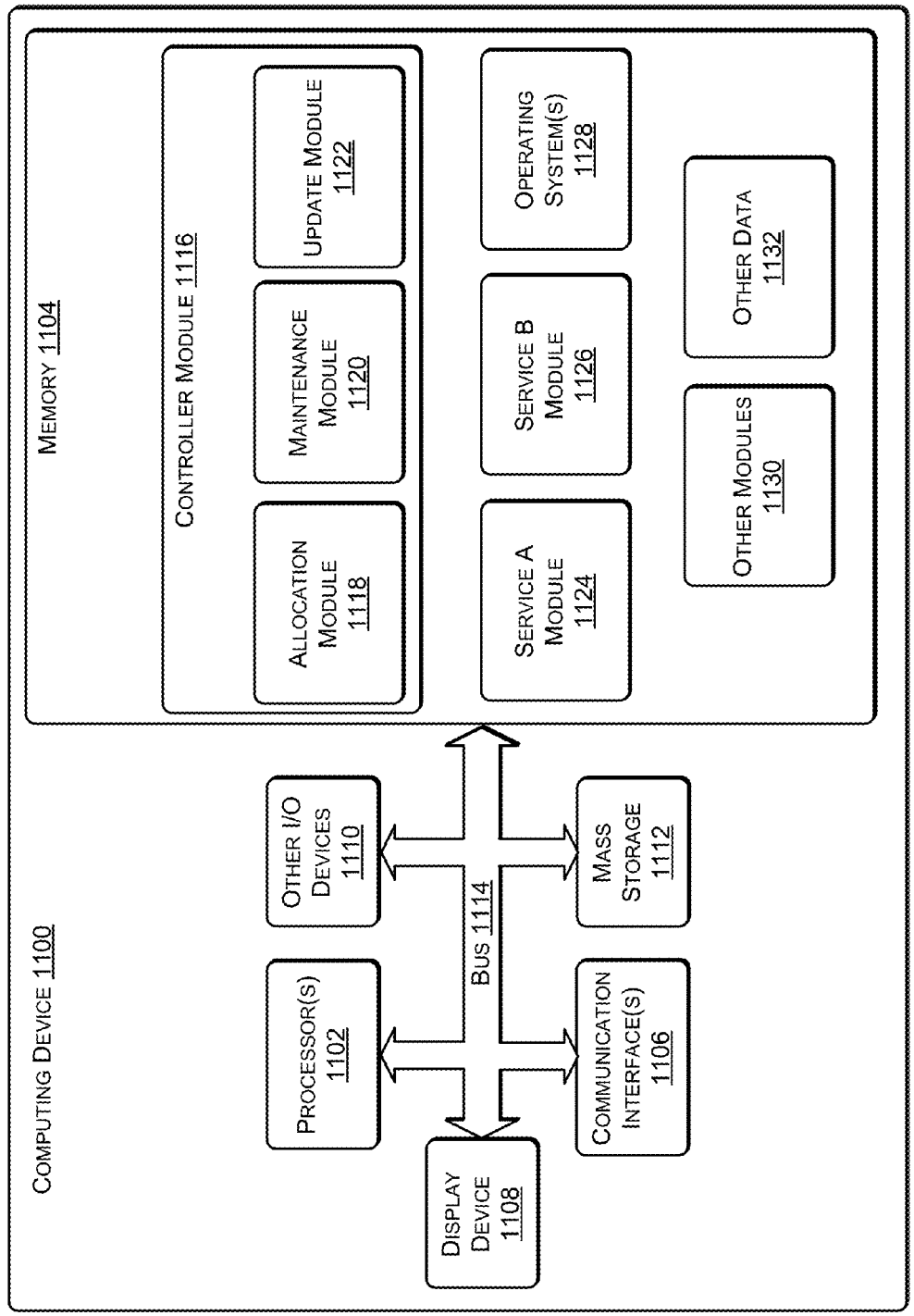
FIG. 11 illustrates an example computing system in which some implementations may operate.

FIG. 11 illustrates an example configuration of a computing device 1100 and an environment that can be used to implement the modules and functions described herein. The computing device 1100 may include at least one processor 1102, a memory 1104, communication interfaces 1106, a display device 1108 (e.g. a touchscreen display or other display), other input/output (I/O) devices 1110 (e.g. a touchscreen display or a mouse and keyboard), and one or more mass storage devices 1112, able to communicate with each other, such as via a system bus 1114 or other suitable connection. As an example, the computing device 1100 may be a machine or node of a distributed computation service (e.g., machine 102-1).

The processor 1102 may be a single processing unit or a number of processing units, all of which may include single or multiple computing units or multiple cores. The processor 1102 can be implemented as one or more microprocessors, microcomputers, microcontrollers, digital signal processors, central processing units, state machines, logic circuitries, and/or any devices that manipulate signals based on operational instructions. Among other capabilities, the processor 1102 can be configured to fetch and execute computer-readable instructions stored in the memory 1104, mass storage devices 1112, or other computer-readable media.

Memory 1104 and mass storage devices 1112 are examples of computer storage media for storing instructions which are executed by the processor 1102 to perform the various functions described above. For example, memory 1104 may generally include both volatile memory and non-volatile memory (e.g., RAM, ROM, or the like). Further, mass storage devices 1112 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 1104 and mass storage devices 1112 may be collectively referred to as memory or computer storage media herein, and may be capable of storing computer-readable, processor-executable program instructions as computer program code that can be executed by the processor 1102 as a particular machine configured for carrying out the operations and functions described in the implementations herein.

The computing device 1100 may also include one or more communication interfaces 1106 for exchanging data with other devices, such as via a network, direct connection, or the like, as discussed above. The communication interfaces 1106 can facilitate communications within a wide variety of networks and protocol types, including wired networks (e.g., LAN, cable, etc.) and wireless networks (e.g., WLAN, cellular, satellite, etc.), the Internet and the like. Communication interfaces 1106 can also provide communication with external storage (not shown), such as in a storage array, network attached storage, storage area network, or the like.

A display device 1108, such as a touchscreen display or other display device, may be included in some implementations. Other I/O devices 1110 may be devices that receive various inputs from a user and provide various outputs to the user, and may include a touchscreen, a keyboard, a remote controller, a mouse, a printer, audio and/or voice input/output devices, and so forth.

Memory 1104 may include modules and components for the computing device 1100 according to the implementations discussed herein. In the illustrated example, memory 1104 may include a controller module 1116 which may include an allocation module 1118, a maintenance module 1120 and an update module 1122. In particular, the example computing device 1100 is of the type mentioned previously which operates the controller functionality as a distributed service operating on at least some of the distributed computation service 102 machines (e.g., 102-1, 102-2, 102-N, or machines 214-236). As such, the example computing device 1100 includes modules for performing the functions of the allocation mechanism, maintenance mechanism and update mechanism discussed above (i.e., it includes the allocation module 1118, the maintenance module 1120 and the update module 1122, respectively). The memory 1104 may further include a service A module 1124, a service B module 1126, and one or more operating systems 1128. Service A module 1124 and service B module 1126 are the modules which are executed by the machines 214-236 to provide service A and service B. These modules may be stored on computing device 1100 to allow it to perform instances of the services. In other implementations, these modules may be added to the machines after allocation of an instance to the machine. The one or more operating systems 1128 may be included to provide operating system support to, for example, service A module 1124 and service B module 1126. As stated previously, while the implementations discussed herein discuss two services being hosted (service A and service B), it should be understood that implementations are not so limited and that many more services may be hosted simultaneously by a distributed computation service 102 for many service owners 104.

Memory 1104 may further include one or more other modules 1130, such as drivers, application software, communication software, other service modules, or the like. Memory 1104 may also include other data 1132, such as data stored while performing the functions described above and data used by the other modules 1130. Memory 1104 may also include other data and data structures described or alluded to herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 11 as being stored in memory 1104 of computing device 1100, the modules 1116-1126, or portions thereof, may be implemented using any form of computer-readable media that is accessible by computing device 1100. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media. Further, although the modules are illustrated in FIG. 11 as being stored in memory 1104 of computing device 1100, in other implementations, the modules, or portions thereof, may be implemented as an application specific integrated circuit (ASIC) or other form of special purpose computing device and integrated with the other hardware and software components of computing device 1100.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A distributed computing system comprising:
one or more computer-readable storage media storing computer-executable instructions of a controller module executed by one or more processors to:
maintain a data structure including a plurality of server update domains, each server update domain including a set of machines of a plurality of machines which may be concurrently updated, the plurality of machines hosting a plurality of instances of each of a plurality of services, each service having a plurality of respective service update domains, wherein a service update domain is an update domain of an instance within a service to which the plurality of server update domains may be mapped, each instance being assigned to one of the plurality of service update domains of the respective service, wherein:
an allocation of instances to the plurality of machines is performed pursuant to a per-service server update domain technique, by mapping from each service update domain to one or more server update domains of the plurality of machines;
the allocation of instances to the plurality of machines is constrained such that each machine of the plurality of machines may not host instances from different service update domains of the same service and an updating of the distributed computing system is constrained such that different machines hosting instances of different service update domains of the same service may not be concurrently updated; and
the controller module allocating the instances to the plurality of machines such that a number of server update domains is minimized in part to minimize a time to perform an update process by, for at least one instance, determining at least one machine of the plurality of machines that, if allocated the at least one instance, may be assigned to a lowest server update domain based on an ordered identification system of the plurality of server update domains.

2. The distributed computing system of claim 1, wherein the service update domains of each service are identified using the ordered identification system of the server update domains and the controller module allocates at least one instance of a service of the plurality of services to a machine of a server update domain with an identifier that is the same as an identifier of the service update domain of the instance.

3. The distributed computing system of claim 1, wherein the controller module maintains, for each service of the plurality of services, a mapping from each service update domain of the service to at least one server update domain.

4. The distributed computing system of claim 3, wherein the mapping from each service update domain of the service to the at least one server update domain indicates one or more server update domains that include at least one machine hosting instances of the service update domain of the service.

5. The distributed computing system of claim 1, wherein the controller module controls an updating of the plurality of machines such that the machines are updated in an order based at least in part on the server update domains.

6. A computer-implemented method comprising:
under control of one or more processors configured with executable instructions,
allocating a plurality of instances of each of a plurality of services to a plurality of machines of a distributed computing system, each service having a plurality of respective service update domains, wherein a service update domain is a domain of an instance within a service to which a plurality of server update domains may be mapped, each instance being assigned to one of the plurality of service update domains of the respective service and wherein:
the allocating of instances to the plurality of machines is performed pursuant to a per-service server update domain technique, by mapping from each service update domain to one or more server update domains of the plurality of machines;
the allocating of instances to the plurality of machines is constrained such that each machine of the plurality of machines may not host instances from different service update domains of the same service and an operation of the distributed computing system is constrained such that different machines hosting instances of different service update domains of the same service may not be concurrently unavailable; and
the allocating of instances is performed such that a number of server update domains is minimized in part to minimize a time to perform an update process; and
maintaining a data structure including the plurality of server update domains, each server update domain including a set of machines of the plurality of machines which may be concurrently be unavailable.

7. The computer-implemented method of claim 6, wherein each machine of the plurality of machines that hosts an instance of the plurality of services is assigned to one of the server update domains.

8. The computer-implemented method of claim 6, wherein the number of server update domains is minimized by, for at least one instance, determining at least one machine of the plurality of machines that, if allocated the at least one instance, may be assigned to a lowest server update domain based on an ordered identification system of the server update domains.

9. The computer-implemented method of claim 6, further comprising:
maintaining, for at least one service of the plurality of services, a mapping from each service update domain of the service to at least one server update domain.

10. The computer-implemented method of claim 9, wherein the mapping from each service update domain of the service to the at least one server update domain indicates one or more server update domains that include at least one machine hosting instances of the service update domain of the service.

11. The computer-implemented method of claim 6, further comprising:
updating the plurality of machines such that the machines are updated in an order based at least in part on the server update domains.

12. One or more computer storage media storing computer-executable instructions that, when executed on one or more processors, perform acts comprising:
allocating a plurality of instances of each of a plurality of services to a plurality of machines of a distributed computing system, each service having a plurality of respective service update domains, each instance being assigned to one of the plurality of service update domains of the respective service and wherein:

the allocating of instances to the plurality of machines is performed pursuant to a per-service server update domain technique, by mapping from each service update domain to one or more server update domains of the plurality of machines;

the allocating of instances to the plurality of machines is constrained such that each machine of the plurality of machines may not host instances from different service update domains of the same service and an updating of the distributed computing system is constrained such that different machines hosting instances of different service update domains of the same service may not be concurrently updated; and the allocating is performed such that a number of groups of different machines that may be updated concurrently to update the plurality of machines is minimized in part to minimize a time to perform an update process.

13. The one or more computer storage media of claim 12, the acts further comprising:

maintaining a data structure including the groups of different machines that may be updated concurrently to update the plurality of machines.

14. The one or more computer storage media of claim 13, the acts further comprising:

updating the plurality of machines such that the machines are updated in an order based at least in part on the groups of different machines included in the data structure.

15. The one or more computer storage media of claim 12, wherein each machine of the plurality of machines that hosts an instance of the plurality of services is assigned to one of the groups.

16. The one or more computer storage media of claim 12, wherein the allocating is performed to minimize the number of groups by, when a first instance is to be allocated to a machine of the plurality of machines:

if a first machine that is available to host the first instance is also part of a group hosting at least one second instance of the same service update domain of the service as the instance to be allocated, allocating the instance to be allocated to the first machine.

17. The one or more computer storage media of claim 12, wherein the allocating is performed to minimize the number of groups by, when a first instance is to be allocated to a machine of the plurality of machines:

if there is no first machine that is available to host the first instance and is also part of a group hosting at least one second instance of the same service update domain of the service as the first instance and there is a second machine of the plurality of machines not currently hosting instances of the plurality of services, allocating the first instance to the second machine.

18. The one or more computer storage media of claim 12, wherein the allocating is performed to minimize the number of groups by, when a first instance is to be allocated to a machine of the plurality of machines:

if there is no first machine that is available to host the first instance and is also part of a group hosting at least one second instance of the same service update domain of the service as the first instance, there is no second machine of the plurality of machines not currently hosting instances of the plurality of services, and there is a third machine which may host the first instance without incurring an service update domain constraint violation, allocating the first instance to the third machine.

19. The one or more computer storage media of claim 12, wherein the allocating is performed to minimize the number of groups by, when a first instance is to be allocated to a machine of the plurality of machines:

if there is no first machine that is available to host the first instance and is also part of a group hosting at least one second instance of the same update service update of the service as the first instance , there is no second machine of the plurality of machines not currently hosting instances of the plurality of services, and there are a plurality of third machines which may host the first instance without incurring an service update domain constraint violation, determining at least one third machine that, if allocated the first instance, may be assigned to a lowest group identifier based on an ordered identification system of the groups; and allocating the first instance to the determined machine.

* * * * *